(No Model.)
J. P. H. GASTRELL.
MECHANISM FOR TRANSFORMING RECIPROCATING MOTION INTO ROTARY MOTION.
No. 428,477. Patented May 20, 1890.
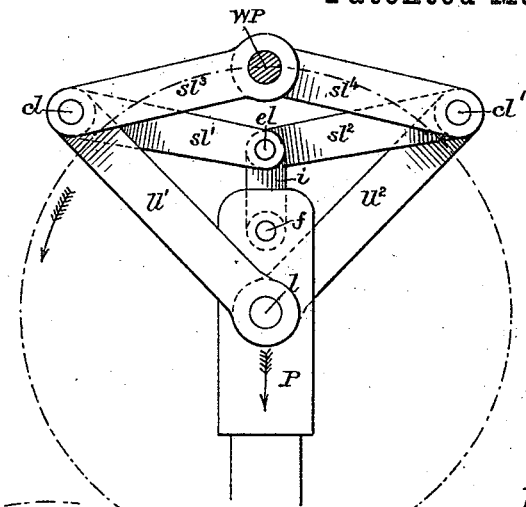
FIG. 1.
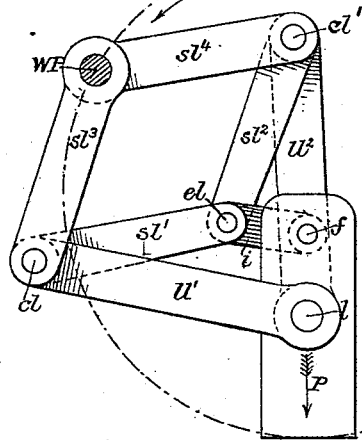
FIG. 2.
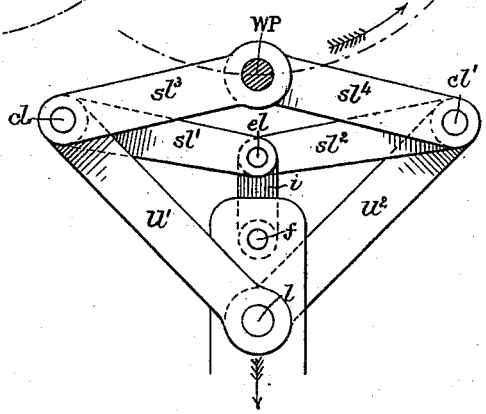
FIG. 4.
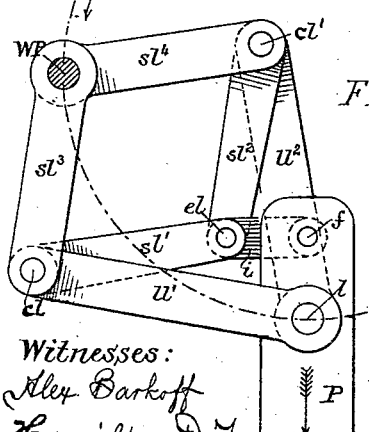
FIG. 3.
FIG. 5.
Witnesses:
Alex Barkoff
Hamilton D. Turner
Inventor:
James P. H. Gastrell
by his Attorneys
Howson & Howson

UNITED STATES PATENT OFFICE.

JAMES P. H. GASTRELL, OF WIESBADEN, GERMANY.

MECHANISM FOR TRANSFORMING RECIPROCATING MOTION INTO ROTARY MOTION.

SPECIFICATION forming part of Letters Patent No. 428,477, dated May 20, 1890.

Application filed January 21, 1890. Serial No. 337,629. (No model.)

*To all whom it may concern:*

Be it known that I, JAMES P. H. GASTRELL, a subject of the Queen of Great Britain and Ireland, and a resident of Wiesbaden, Nassau, Germany, and domiciled within the territory of the said Nassau, have invented certain Improvements in Mechanism for Transforming Reciprocating Motion into Rotary Motion, of which the following is a specification.

The object of my invention is to construct an improved mechanical movement by which a reciprocating motion is converted into a rotary motion, or a rotary motion converted into a reciprocating motion, by which means the distance between the head of the reciprocating portion and the pin of the crank is greatly reduced, and by which means machines in which the crank is used with a connecting-rod are made more compact, as fully described hereinafter, reference being had to the accompanying drawings, in which—

Figures 1, 2, 3, 4, and 5 are diagram views illustrating the movement of the mechanism.

If, for instance, the movement is applied to an engine in which the reciprocating motion is represented by the piston-rod and the rotary motion by the crank, I connect to the head P of the piston-rod two long links $ll'$ $ll^2$ by the pivot-pin $l$ and to the wrist-pin W of the crank two short links $sl^3$ $sl^4$. These links are connected to the long links by pivot-pins $cl$ $cl'$, and pivoted to these pins are short links $sl'$ and $sl^2$, which are connected together and to a link $i$ by a pivot-pin $el$. This link $i$ is pivoted to the head P by a pin $f$, as clearly shown in Fig. 1 of the drawings. All the links are free to move on their centers or pivots. If the head P is moved in the direction of the arrow, Fig. 1, and the wrist-pin moves over the center in the circle (indicated by dotted lines) and in the direction shown by the arrow, the tendency of the mechanism will be to force the links pivoted at $cl$ down in the direction of the arrow, and the links pivoted at $el$ out, as indicated by the arrow, thus forcing the wrist-pin in the circular course, as will be clearly understood in following out the movements of the different parts, as indicated in the diagram, Figs. 2 and 3.

When the wrist-pin reaches the quarter-turn or half-stroke, Fig. 3, the tendency of the device is to still draw the links centered on the pivot $cl$ down, and the links centered on the pivot $el$ in an inclined line, as shown by the arrow, until the full stroke is reached, as shown in Fig. 4, and the wrist-pin has traveled one-half of its revolution. On the return-stroke the above-described movements are reversed, as is clearly shown in Fig. 5.

I am thus enabled to connect a reciprocating rod or head to a crank or wrist pin by a series of short links, dispensing with the usual long connecting-rod.

My invention can be applied to any machine in which a reciprocating motion is transformed into a rotary motion, and in an engine the mechanism may be attached to the valve-operating devices, as well as to the piston rod and crank.

It will be understood that the several links shown may be of different lengths and proportions, depending altogether upon the construction of the apparatus to which it is applied.

It will be understood that the crank carrying the wrist-pin can be rotated and reciprocating motion imparted to the head, as would be the case in operating valve-gears and similar mechanism.

I claim as my invention—

The combination of the reciprocating head, long links, both pivoted to the head at the same point with a wrist-pin, two short links pivoted to said wrist-pin and pivoted at their outer ends, respectively, to the long links, with short links $sl'$ $sl^2$ also pivoted to the short and long links, and pivoted at their inner ends to each other and to a link $i$, which is pivoted to the head at its opposite end, the whole acting, substantially as described, on the reciprocation of the head or the rotation of the crank.

In testimony whereof I have signed my name to this specification in the presence of two subscribing witnesses.

JAMES P. H. GASTRELL.

Witnesses:
EUGENE ELTERICH,
HENRY HOWSON.